United States Patent
Patil et al.

(10) Patent No.: US 10,113,903 B1
(45) Date of Patent: Oct. 30, 2018

(54) AMBIENT LIGHT SENSOR CALIBRATION

(71) Applicant: Amazon Technologies, Inc., Reno, NV (US)

(72) Inventors: Prashanth Basavaraj Patil, Santa Clara, CA (US); Jian Song, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 368 days.

(21) Appl. No.: 14/474,637

(22) Filed: Sep. 2, 2014

(51) Int. Cl.
*G01N 21/17* (2006.01)
*G01J 1/02* (2006.01)

(52) U.S. Cl.
CPC ........... *G01J 1/0295* (2013.01); *G01J 1/0271* (2013.01)

(58) Field of Classification Search
CPC .................................. G01J 1/4204; G01J 5/00
See application file for complete search history.

(56) References Cited

U.S. PATENT DOCUMENTS

| | | | |
|---|---|---|---|
| 3,645,627 A * | 2/1972 | Brody | G01J 1/08 356/243.2 |
| 5,561,290 A | 10/1996 | Strobel et al. | |
| 5,619,284 A | 4/1997 | Magocs | |
| 5,701,058 A | 12/1997 | Roth | |
| 6,038,038 A | 3/2000 | Selby et al. | |
| 6,078,388 A | 6/2000 | Njamfa | |
| 6,313,459 B1 | 11/2001 | Hoffe et al. | |
| 6,396,040 B1 | 5/2002 | Hill | |
| 6,576,883 B1 | 6/2003 | McCoy | |
| 6,667,803 B1 * | 12/2003 | Flessland | A61B 5/0059 356/319 |
| 6,946,715 B2 * | 9/2005 | Hong | H01L 27/1463 257/291 |
| 7,041,979 B2 * | 5/2006 | Chrisp | G01J 3/02 250/339.07 |
| 7,154,157 B2 * | 12/2006 | Bradski | H01L 27/14647 257/440 |
| 7,170,046 B2 * | 1/2007 | Higashitsutsumi | H01L 27/14621 250/208.1 |
| 7,190,126 B1 | 3/2007 | Paton | |
| 7,230,222 B2 | 6/2007 | Cheng et al. | |
| 7,265,343 B2 | 9/2007 | Bosser | |
| 7,277,930 B2 | 10/2007 | Hillis et al. | |
| 7,378,628 B2 | 5/2008 | Maldziunas | |
| 7,408,365 B2 | 8/2008 | Lee et al. | |
| 7,411,636 B2 | 8/2008 | Abileah | |
| 7,482,565 B2 | 1/2009 | Morgan et al. | |
| 7,504,612 B2 | 3/2009 | Yu et al. | |
| 7,642,501 B1 | 1/2010 | Fassbender et al. | |
| 7,750,282 B2 | 7/2010 | Mahowald et al. | |
| 7,777,166 B2 * | 8/2010 | Roberts | F21K 9/00 250/205 |
| 7,781,713 B2 | 8/2010 | Papamichael et al. | |
| 7,840,246 B1 * | 11/2010 | Poore | A61B 5/14535 600/339 |

(Continued)

*Primary Examiner* — David Porta
*Assistant Examiner* — Djura Malevic
(74) *Attorney, Agent, or Firm* — K&L Gates LLP

(57) ABSTRACT

An ambient light sensor of an electronic device is calibrated using a calibration device and method which combines multiple sources of light having different wavelengths into a single calibration beam of light. This calibration beam of light provides a consistent and reproducible methodology for testing and calibrating the ambient light sensor.

20 Claims, 5 Drawing Sheets

(56) References Cited

U.S. PATENT DOCUMENTS

| | | | |
|---|---|---|---|
| 8,076,628 B2 | 12/2011 | Mahowald | |
| 8,107,250 B2 | 1/2012 | Tseng et al. | |
| 8,227,731 B2 | 7/2012 | Hick et al. | |
| 8,242,707 B2 | 8/2012 | Lum | |
| 8,344,872 B2* | 1/2013 | Minckler | G07B 17/00661 |
| | | | 340/501 |
| 8,354,793 B2 | 1/2013 | Cash et al. | |
| 8,410,706 B2 | 4/2013 | Steiner et al. | |
| 8,436,308 B2* | 5/2013 | Choe | H01L 27/14652 |
| | | | 250/339.05 |
| 8,456,410 B2 | 6/2013 | Kalnitsky et al. | |
| 8,481,917 B2 | 7/2013 | Chen et al. | |
| 8,492,699 B2 | 7/2013 | Zheng et al. | |
| 8,536,511 B2 | 9/2013 | Tam | |
| 8,648,550 B2 | 2/2014 | Staab | |
| 8,705,015 B2 | 4/2014 | Chang et al. | |
| 8,896,744 B2* | 11/2014 | Ogasahara | G02B 3/0056 |
| | | | 348/164 |
| 2005/0051708 A1 | 3/2005 | Hotelling | |
| 2006/0114551 A1* | 6/2006 | Okada | H01L 27/14645 |
| | | | 359/350 |
| 2007/0065207 A1* | 3/2007 | Margolis | B41J 13/12 |
| | | | 400/76 |
| 2007/0201738 A1* | 8/2007 | Toda | H04N 9/045 |
| | | | 382/144 |
| 2007/0273781 A1* | 11/2007 | Choe | H01L 27/14621 |
| | | | 348/311 |
| 2008/0001850 A1* | 1/2008 | Champion | G02B 26/101 |
| | | | 345/7 |
| 2008/0042044 A1* | 2/2008 | Koyama | G01J 1/04 |
| | | | 250/205 |
| 2008/0068475 A1* | 3/2008 | Choe | G06T 3/4015 |
| | | | 348/273 |
| 2008/0314114 A1* | 12/2008 | Feke | G01N 21/278 |
| | | | 73/1.01 |
| 2009/0124875 A1* | 5/2009 | Bentsen | A61B 5/14539 |
| | | | 600/341 |
| 2009/0148169 A1* | 6/2009 | Porjo | G01J 3/02 |
| | | | 398/135 |
| 2011/0140879 A1* | 6/2011 | Minckler | G07B 17/00661 |
| | | | 340/501 |
| 2011/0169414 A1 | 7/2011 | Schmitz | |
| 2012/0019494 A1* | 1/2012 | Lum | G09G 5/10 |
| | | | 345/207 |
| 2012/0200734 A1* | 8/2012 | Tang | H04N 5/23245 |
| | | | 348/223.1 |
| 2012/0307205 A1* | 12/2012 | Zhou | A61B 3/1015 |
| | | | 351/206 |
| 2013/0242056 A1* | 9/2013 | Fleck | H04N 13/044 |
| | | | 348/47 |
| 2013/0242290 A1* | 9/2013 | Yin | G01J 1/0271 |
| | | | 356/218 |
| 2013/0278576 A1 | 10/2013 | Lee et al. | |
| 2013/0293113 A1 | 11/2013 | Morrow | |
| 2013/0293681 A1* | 11/2013 | Borowski | G01S 7/483 |
| | | | 348/46 |
| 2013/0328842 A1 | 12/2013 | Barnhoefer et al. | |
| 2014/0146088 A1* | 5/2014 | Wyrwas | G09G 5/10 |
| | | | 345/690 |
| 2014/0152632 A1 | 6/2014 | Shedletsky et al. | |
| 2014/0214367 A1* | 7/2014 | Tong | G02F 1/1309 |
| | | | 702/189 |
| 2014/0346359 A1* | 11/2014 | Holliday | H04N 5/23229 |
| | | | 250/340 |
| 2015/0338271 A1* | 11/2015 | Aubert | G01J 1/08 |
| | | | 250/208.2 |
| 2015/0364107 A1* | 12/2015 | Sakariya | G06F 3/0412 |
| | | | 345/174 |

\* cited by examiner

AMBIENT LIGHT SENSOR CALIBRATION

BACKGROUND

Many electronic devices, such as tablet computers, electronic book readers, smartphones, and other mobile computing devices, include an ambient light sensor (ALS). An ALS measures the surrounding ambient light, and based on such measurements, the brightness or light intensity of luminance components are adjusted. Such luminance components include a graphical display, an indicator light, a backlit button, and the like. For example, if an electronic device is used outdoors on a sunny day, the graphical display's brightness may be automatically adjusted to a maximum setting. For further example, if an electronic device is used in a dark room at night, the graphical display's brightness may be automatically adjusted to a minimum setting.

An ALS may have one or more photodiodes, or the like, and each photodiode may measure the light intensity or lux of various ranges of wavelengths of ambient light. Due to manufacturing variances between sensors, for example part-to-part variations, each ALS may provide different measurements of the same ambient light conditions. An ALS may also be positioned behind a glass, such as a cover glass, and in order to camouflage or hide the ALS from the view of a user, the portion of the cover glass covering the ALS may be darkened, colored, or blackened. Because darkened glass can absorb visible light, darkened glass can reduce the transmission of light in the visible light spectrum, such as green light, but not significantly reduce the transmission of light in the invisible light spectrum, such as infrared light. Due to variances in each cover glass's transmission of ambient light to an ALS, such as when one cover glass is slightly darker than another cover glass, there may be variances in light measurements of the same ambient light conditions by sensors behind different darkened glass.

DETAILED DESCRIPTION

In the following description, reference is made to the accompanying drawings which illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale. It is to be further understood that the term light is not limited to visible light, and may include non-visible light such as infrared light. It is also to be understood that emission of light may include transmission of light and reflection of light.

Figure 1:
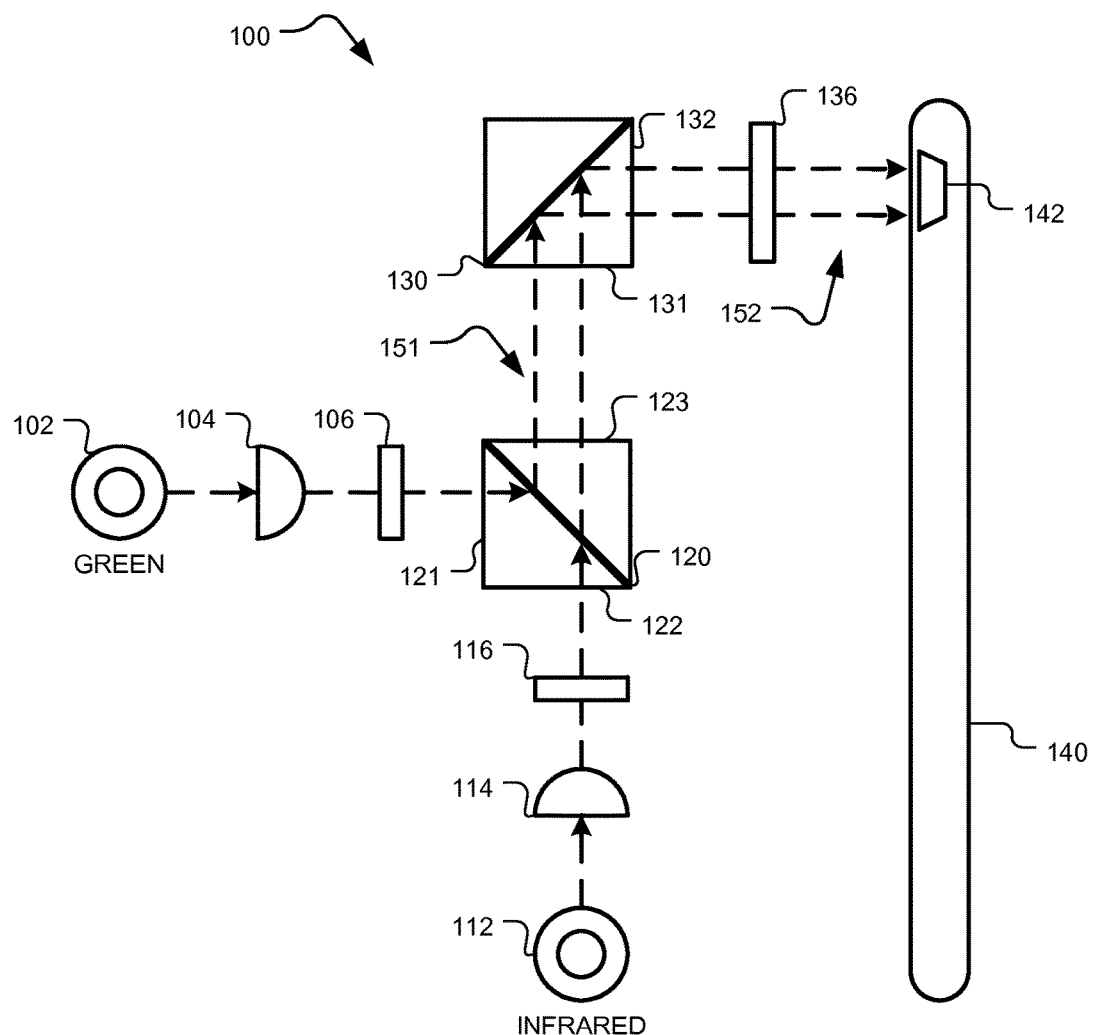
FIG. 1 is a schematic illustration of an example ALS calibration system, in accordance with embodiments of the present invention.

FIG. 1 is a schematic illustration of an example ALS calibration system 100, in accordance with embodiments of the present invention. A first light emitter 102 or first light emitting device may emit first light having a first wavelength, such as 530 nm green light. The first light emitter 102 may comprise any suitable device for generating light, such as, for example, a mounted light emitting diode (LED) item number M530L3 from Thorlabs, Inc., of Newton, N.J.

An optional first light collimator 104 may be positioned to receive light from the first light emitter 102. For example, although not shown, a lens tube carrying the first light collimator 104 may be mounted to the first light emitter 102. The first light collimator 104 collimates the light by partially collimating, condensing, partially condensing, or straightening the light, such that the beam emitted from the collimator 104 is approximately homogenous and not highly divergent. The first light collimator 104 may comprise, for example, an aspheric condenser lens item number ACL2520 from Thorlabs, Inc. In an embodiment in which the ALS calibration system 100 does not include the first light collimator 104, the first light emitter 102, such as a laser or the like, may emit a collimated or partially collimated first light.

An optional first light diffuser 106 may be positioned to receive light from the first light collimator 104. For example, although not shown, a lens tube carrying the first light diffuser 106 may be coupled to the lens tube carrying the first light collimator 104. The first light diffuser 106 may diffuse or partially diffuse the collimated first light, such that for example, the beam transmitted from the diffuser 106 is approximately divergent or dispersed to achieve increased uniformity of the beam, as may occur with natural ambient light. The first light diffuser 106 may comprise, for example, a Gaussian glass diffuser item number DG10-600-MD from Thorlabs, Inc.

As illustrated in FIG. 1, similar to the first light emitter 102, a second light emitter 112 or second light emitting device may emit second light having a second wavelength, such as 940 nm infrared light. The second light emitter 112 may comprise, for example, a mounted LED item number M940L3 from Thorlabs, Inc. Similar to the optional first light collimator 104, an optional second light collimator 114 may be positioned to receive light from the second light emitter 112. Similar to the optional first light diffuser 106, an optional second light diffuser 116 may be positioned to receive light from the second light collimator 114. It is to be understood that the examples of green light and infrared light are not to be considered limiting, and any appropriate color, visible, and/or invisible light wavelengths may be chosen for calibrating an ALS.

The ALS calibration system 100 includes a light combiner 120. The light combiner 120 may be positioned to receive the first light and/or the second light, and may combine the first light with the second light. For example, the light combiner 120 may reflect the first light emitted from the first light emitter 102 and transmit the second light emitted from the second light emitter 112. The light combiner 120 may include a first entry port 121 that may comprise a reflection entry port, a second entry port 122 that may comprise a transmission entry port, and an exit port 123. Under an embodiment, the light combiner 120 may be positioned to receive the first light at the first entry port 121 and to receive the second light at the second entry port 122, and the combined first light and second light may exit the light combiner 120 at the exit port 123. In some embodiments, the light combiner 120 may output the first light and the second light separately or as a combined light beam. Such separate light beams or combined light beams may be directed along a first light path 151. The light combiner 120 may comprise, for example, a beam splitter cube item number CM1-BS013 from Thorlabs, Inc.

The ALS calibration system 100 may include an optional light reflector 130 or a beam turning mirror. The light reflector 130 may be positioned to receive and reflect or turn the first light and/or the second light towards an ALS 142. For example, the light reflector 130 may reflect the first light and the second light. In some embodiments, the light reflector 130 may comprise an entry port 131 and an exit port 132. Under an embodiment, the light reflector 130 may be positioned to receive the first light and the second light at the entry port 131, and the first light and the second light may exit the light reflector 130 at the exit port 132. Light that exits at the exit port 132 may be directed along a second light path 152. It is to be understood that the first light path 151 may be considered to comprise the second light path 152, such that both the first light path 151 and the second light path 152 may both be considered to direct light towards the ALS 142. Although not shown, the light combiner 120 may be coupled to the light reflector 130 with a lens tube or the like. The light reflector 130 may comprise, for example, a kinematic beam turning cube item number DFM-P01 from Thorlabs, Inc.

An optional third light diffuser 136 may be positioned to receive light from the light reflector 130. For example, although not shown, a lens tube carrying the third light diffuser 136 may be coupled to the light reflector 130. The third light diffuser 136 may diffuse or partially diffuse the first light and/or the second light, such that for example, the beam transmitted from the diffuser 136 is approximately uniform.

Under an embodiment, the ALS 142 of an electronic device 140 may receive the first light and the second light, with which the ALS 142 may be calibrated. For example, the first light emitter 102 may emit 530 nm green light at a first irradiance, such as 30 µW/cm² of optical power, which may be considered to be about 200 lux of ambient light. The second light emitter 112 may emit 850 nm infrared light at a second irradiance, such as 50 µW/cm² of optical power. Under some embodiments, the manufacturer of the ALS 142 may define the proper light wavelengths and irradiance to be utilized to calibrate the ALS 142, and an infrared light wavelength may be chosen in order to remove infrared light from ambient light measurements. Under some embodiments, no current from a light emitter or dark current may be measured in order to calibrate the lux count in the absence of light. The ALS 142 may have a sensitivity to measure a count of lux, such as 0.045 lux per least significant bit (LSB). A cover glass overlapping or proximate the ALS 142 may have an average visible light transmission rate, such as 14%. Accordingly, for example, a target count for illumination of about 200 lux ambient light exterior to a display glass may be about 622, where 200 lux is multiplied by 14% cover glass light transmission and divided by 0.045 lux/LSB. If a measured lux count measured by the ALS 142 significantly differs from an expected lux count, such as about 622, then a gain may be determined based on the measured lux count in order to calibrate the ALS 142, and the gain may be stored in non-volatile memory of the ALS 142. Under some embodiments, an ALS may comprise two or more light detectors, such as photodiodes. For example, one light detector may respond to the first light emitter 102 and another light detector may respond to the second light emitter 112. A gain may be determined for each light detector, such as a first gain for the first light detector and a second gain for the second light detector. Accordingly, a calibrated measurement or reading of a light source may be determined by multiplying a first gain with a first measurement by the first light detector and multiplying a second gain with a second measurement of the second light detector.

A benefit of certain embodiments of the ALS calibration system 100 may be that the accuracy of the calibration scheme can be improved from about plus or minus 15% to about plus or minus 3%. For example, a plus or minus 15% gain error may occur where a printed circuit board assembly (PCBA) contains a plurality of high-powered LEDs, such as visible light LEDs and infrared light LEDs, with a heavy diffuser above the high-powered LEDs, which may scatter light and reduce the transmission of light. However, by utilizing one LED per wavelength of light, passing light through a collimator and a diffuser, passing the collimated and diffused light through a light combiner, and directing the collimated light to an ALS, an approximate plus or minus 3% gain error may be achieved. This improved accuracy may be beneficial because, with a PCBA having a plurality of LEDs, it may be necessary for an ALS to take multiple lux measurements, such as 10, 15, or 50 measurements, and average the lux measurements for a calibration scheme. In comparison, under an embodiment described herein, a single lux measurement may be taken for a calibration scheme, in which a greater transmission percentage of light is achieved from each light emitter. Furthermore, with an absence of a plurality of high-powered LEDs mounted on a PCBA and an absence of a heavy diffuser that may absorb 90-95% of light, under an embodiment, a high intensity of light can be emitted with a reduced need for coolants or ventilation.

Figure 2:
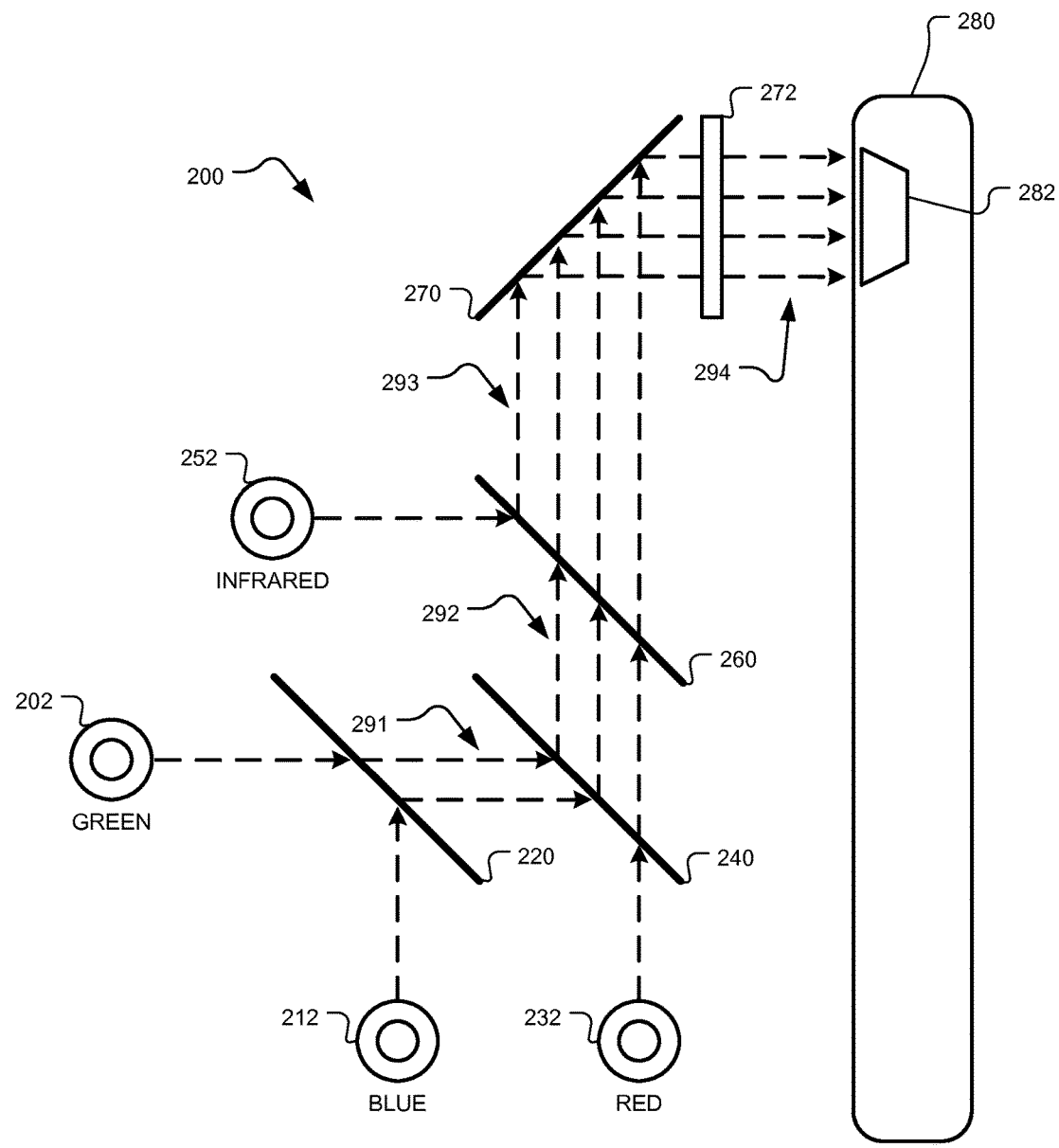
FIG. 2 is a schematic illustration of an example ALS calibration system, in accordance with embodiments of the present invention.

FIG. 2 is a schematic illustration of an example ALS calibration system 200, in accordance with embodiments of the present invention. A first light emitter 202 may emit first light having a first wavelength, such as 530 nm green light. A second light emitter 212 may emit second light having a second wavelength, such as 470 nm blue light. The ALS calibration system 200 includes a first light combiner 220, such as a dichroic mirror having a transmission band of 520-700 nm and a reflection band of 380-490 nm. The first light combiner 220 may be positioned to receive the first light and the second light, and combine the first light with the second light when such is emitted concurrently. For example, the first light combiner 220 may transmit the first light emitted from the first light emitter 202 and reflect the second light emitted from the second light emitter 212, to generate a combined beam of light. Light that is output from the first light combiner 220 may be directed along a first light path 291.

Under some embodiments, the ALS calibration system 200 may include a third light emitter 232 and a second light combiner 240. The third light emitter 232 may emit third light having a third wavelength, such as 625 nm red light. The second light combiner 240 may be a dichroic mirror having a transmission band of 620-700 nm and a reflection band of 470-590 nm. The second light combiner 240 may be positioned to receive the third light and combined first light and second light, and combine the third light with the combined first light and second light, when such is emitted concurrently. For example, the second light combiner 240 may transmit the third light emitted from the third light emitter 232 and reflect the combined first light and second light. Light that is output from the second light combiner 240 may be directed along a second light path 292.

Under some embodiments, the ALS calibration system 200 may include a fourth light emitter 252 and a third light combiner 260. The fourth light emitter 252 may emit fourth light having a fourth wavelength, such as 940 nm infrared light. The third light combiner 260 may be a dichroic mirror having a transmission band of 400-790 nm and a reflection band of 830-1300 nm. The third light combiner 260 may be positioned to receive the fourth light and combined first light, second light and third light, when such is emitted concurrently. For example, the third light combiner 260 may reflect the fourth light emitted from the fourth light emitter 252 and transmit the combined first light, second light, and third light. Light that is output from the third light combiner 260 may be directed along a third light path 293.

The ALS calibration system 200 may include an optional light reflector 270, such as a right angle beam turning mirror having a band of 450-20000 nm. The light reflector 270 may be positioned to receive and reflect light, such as one or more of the first light, the second light, the third light, and the fourth light, towards an ALS 282 of an electronic device 280. For example, light that is output from the light reflector 270 may be directed along a fourth light path 294 that leads to the ALS 282. It is to be understood under some embodiments, the first light path 291 may comprise the second light path 292, the second light path 292 may comprise the third light path 293, and the third light path 293 may comprise the fourth light path 294. An optional light diffuser 272, such as a Gaussian diffuser, may be positioned to receive light from the light reflector 270, such as the light diffuser 272 may be positioned on the fourth light path 294. For example, although not shown, a lens tube carrying the light diffuser 272 may be coupled to the light reflector 270. The ALS 282 may receive the first light, the second light, the third light, and/or the fourth light.

It is to be understood that, as illustrated in FIG. 1, light emitted from a light emitter may be collimated with a light collimator. It is to be further understood that, as illustrated in FIG. 1, under some embodiments collimated light may be diffused with a light diffuser. It is also to be understood that, although not shown, a dichroic mirror may be mounted in a module or cube having a first entry port, a second entry port, and an exit port, and a beam reflecting or turning mirror may be mounted in a module or cube having an entry port and an exit port. In some embodiments, a light combiner that comprises a beam splitter may reflect and transmit light independent of wavelength, while, in some embodiments, a light combiner that comprises a dichroic mirror may transmit and reflect light as a function of wavelength.

Figure 3:
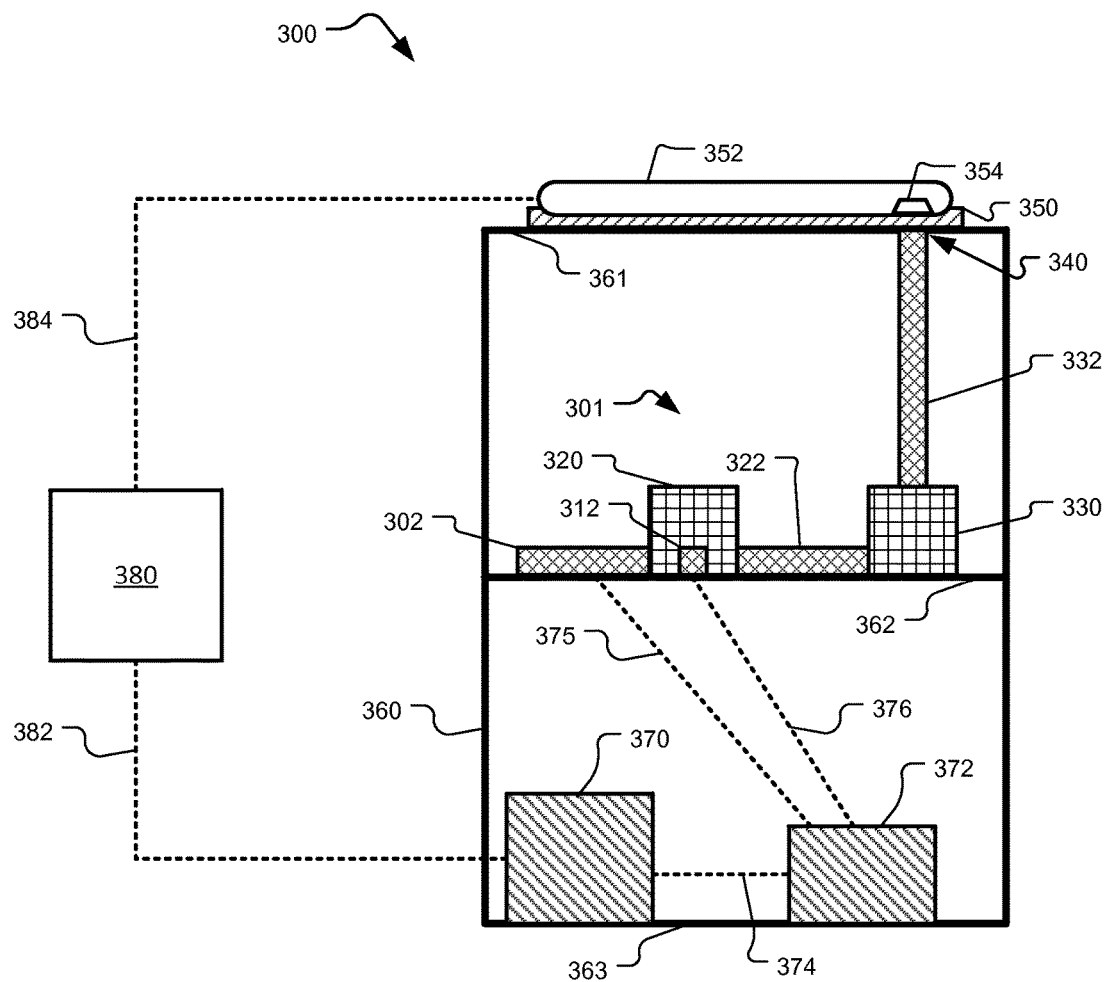
FIG. 3 is a block diagram illustrating an example ALS calibration system, in accordance with embodiments of the present invention.

FIG. 3 is a block diagram illustrating an example ALS calibration system 300, in accordance with embodiments of the present invention. The ALS calibration system 300 includes a housing 360 or frame comprising a first member 361 or platform, a second member 362 or platform, and an optional third member 363 or platform. For example, the second member 362 may oppose the first member 361. For further example, the third member 363 may oppose the first member 361, and the second member 362 may be between the first member 361 and the third member 363. In an embodiment, four pillars may couple the third member 363 with the second member 362 to support the second member 362, and four pillars may couple the second member 362 with the first member 361 to support the first member 361. In an embodiment, four side members or walls may extend between and be orthogonal to the first member 361 and the second member 362 to form an enclosure that may hold an illumination assembly 301, for example, the enclosure may have dimensions of a 12 inch by 12 inch by 15 inch box. The first member 361, the second member 362, and the four side members may comprise an opaque material to prevent or reduce exterior light from entering the enclosure.

The illumination assembly 301 may comprise a first light emitter module 302 and a second light emitter module 312, which, as illustrated in FIG. 3, may be parallel to the second member 362 and may be positioned at a right angle with respect to each other. The first light emitter module 302 and the second light emitter module 312 may each include a mounted LED, a collimator lens, and a diffuser. The first light emitter module 302 and the second light emitter module 312 may be coupled to a light combiner module 320 that combines light emitted by the first light emitter module 302 and the second light emitter module 312. The light combiner module 320 may be coupled to a light reflector module 330, such as with a light tube 322, and the light reflector module 330 may reflect or turn the combined first light and second light, for example at a right angle. For example, if the first light and/or the second light enter the light reflector module 330 on a horizontal plane, such light may exit the light reflector module 330 on a vertical plane. The light reflector module 330 may be coupled to a test light exit port 340, such as with a light tube 332 that is perpendicular to the second member 362. In some embodiments, the light tube 332 may comprise a light diffuser. Although the illumination assembly 301 is depicted as a system closed to external light, it is to be understood that the light tube 322 and the light tube 332 are each optional, such as when the illumination assembly is positioned in the enclosure of the housing 360 such that external light is prevented from entering the enclosure.

The test light exit port 340 of the illumination assembly 301 may transmit a test light. The test light may include the first light and/or the second light. For example, in some embodiments, a test light may be generated from either a first light or a second light. In other embodiments, the first light and the second light may be combined to generate the test light. While the illumination assembly 301 may resemble the embodiment illustrated in FIG. 1, in which two beams of light may be combined if emitted concurrently, it is to be understood that the illumination assembly 301 may include three or more light emitter modules, in which the light from the light emitter modules may be combined by two or more light combiner modules. For example, the illumination assembly 301 may resemble the embodiment illustrated in FIG. 2, in which four beams of light may be emitted.

The ALS calibration system 300 may include a fixture 350 that retains an electronic device 352 having an ALS 354. The fixture 350 may be coupled to the first member 361, and the first member 361 may have an exposure aperture through which test light from the test light exit port 340 may pass. The fixture 350 may retain the electronic device 352 in a position such that the ALS 354 is proximate the exposure aperture and the test light exit port 340, such that the ALS 354 receives the test light from the test light exit port 340. The fixture 350 may also be configured to prevent or block ambient light from reaching the test light exit port 340 when the electronic device 352 is retained by the fixture 350. An advantage of the fixture 350 is that multiple fixtures may be interchangeable with the first member 361. In some embodiments, each type of electronic device, such as tablets having different sizes, or different devices such as e-readers, phones and tablets, may have a fixture 350 specially configured to hold each type of device. Furthermore, the fixture 350 may be advantageous during manufacturing of electronic devices in which such devices may be moved from one station to another during the manufacturing process.

The ALS calibration system 300 may include a computing system 380 comprising a computing device, such as a personal computer with a processor and memory. The computing system 380 may be operably coupled to the electronic device 352 via an ALS channel 384, such as a USB cable, or other wired or wireless communication link. The electronic device 352 may transmit to the computing system 380 measurements of the test light from the test light exit port 340, and the computing system 380 may collect a log of such ALS measurements during calibration. The electronic device 352 may determine the calibration values, such as the gain to be stored by the ALS, and transmit the calibration values to the ALS. The electronic device 352 may also determine an ALS 354 failure condition based on comparing a measured lux or intensity with a minimum limit and a maximum limit. Under some embodiments, the computing system 380 and/or the ALS 354 may determine the calibration values or failure conditions.

The computing system 380 may be coupled to an emitter driver 370 via a control channel 382. The emitter driver 370 may be coupled to a connector 372, via a driver channel 374. The connector 372 may be coupled to the first light emitter module 302 via a first current channel 375 and coupled to the second light emitter module 312 via a second current channel 376. The emitter driver 370 may be configured to concurrently drive each light emitter via the connector 372, based on instructions received from the computing system 380. For example, the emitter driver 370 may supply a current from 0 mA to 1000 mA for each channel to a light emitter, in which the chosen current causes the light emitter to emit light having a selected light irradiance or energy level. The emitter driver 370 may comprise, for example, a four channel LED driver item number DC4104 from Thorlabs, Inc. The connector 372 may comprise, for example, an LED connector hub item number DC4100-HUB from Thorlabs, Inc. The first current channel 375 and the second current channel 376 may each comprise, for example, an LED connection cable item number CAB-LEDD1 from Thorlabs, Inc.

In some embodiments, the computing system 380 may cause light to be emitted at various light intensities. For example, the computing system 380 may cause light to be emitted at an energy level approximating 50 lux, 100 lux, 200 lux, 400 lux, or 800 lux. Such may allow ALS calibration linearity by curve fitting from very low light conditions to very bright conditions, for example, using polynomial equations. An energy level or irradiance may be determined by the computing system 380 and driven by the emitter driver 370. Under some embodiments, each light emitter may be controlled to emit light one at a time, while under other embodiments, the light emitters may be controlled to emit light at the same time.

Figure 4:
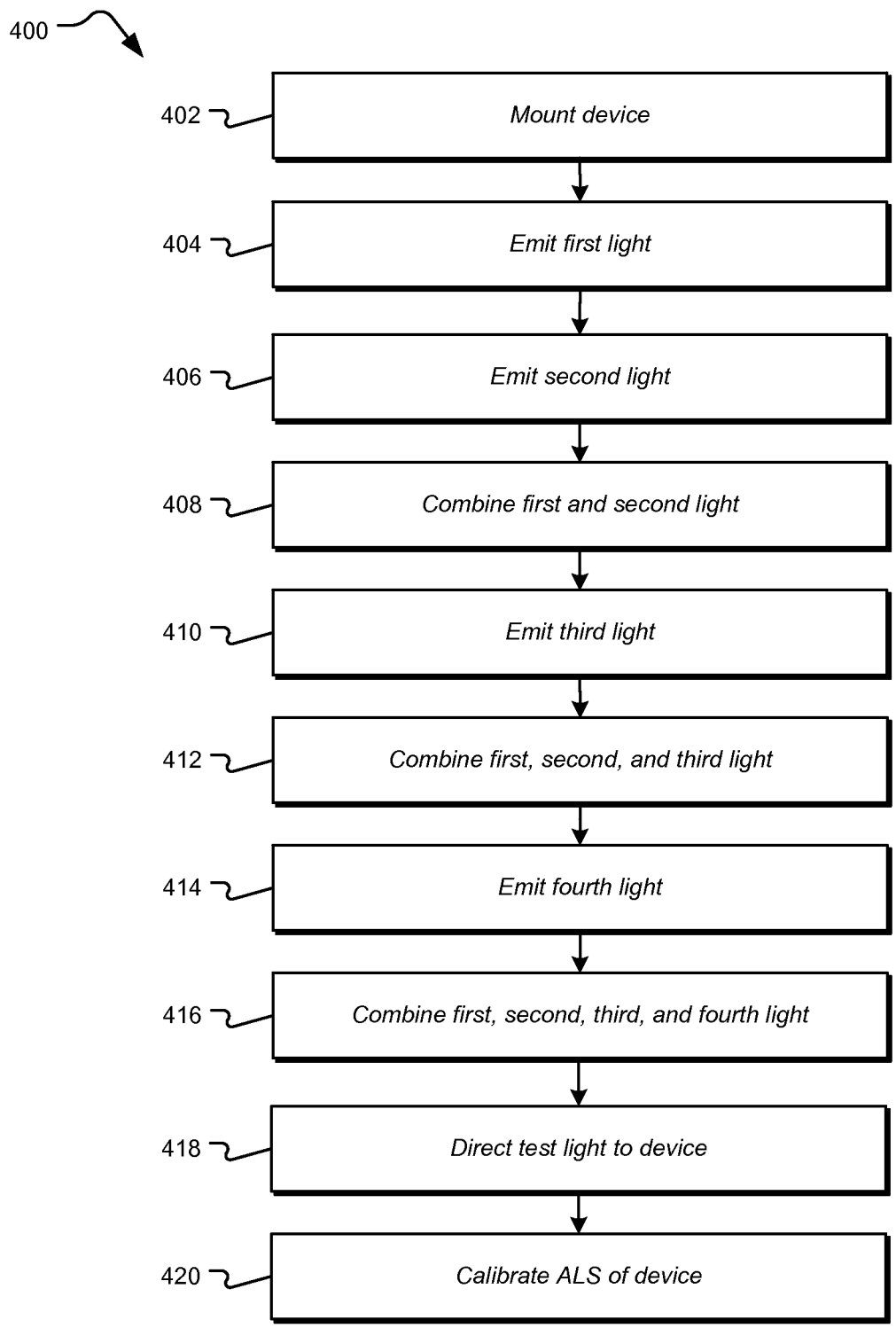
FIG. 4 illustrates a flow diagram of an example process of calibrating an ALS, in accordance with embodiments of the present invention.

FIG. 4 illustrates a flow diagram of an example process 400 of calibrating an ALS, in accordance with embodiments of the present invention. At step 402, the electronic device 352 may be mounted or retained to the fixture 350. In some embodiments, the ALS 354 of the electronic device 352 may be beneath a cover glass, and the electronic device 352 may be placed with the cover glass facing the first member 361 such that the ALS 354 may be proximate the exposure aperture of the fixture 350 or the test light exit port 340. In some embodiments, after the electronic device 352 is mounted, the computing system 380 may initiate a calibration process by transmitting a command or instruction to the electronic device 352 to set the ALS 354 to calibration mode, user mode, diagnostic mode, or the like. Such a command may be a command to begin calibration measurement. For example, the ALS 354 may be in a factory mode after it is installed with the electronic device 352. The processor or chip set of the electronic device 352 may receive an instruction or command from the computing system 380 and may then respond to the instruction by setting one or more switches or registers of a registry of the ALS 354. For example, a registry setting of the ALS 354 may cause the ALS 354 to start or enter a mode in which calibration of the ALS 354 may occur. In addition, the electronic device 352 may start or enter a diagnostic mode.

At step 404, a first light is emitted. In some embodiments, the first light may be emitted by the first light emitter module 302, and the first light may be collimated and/or diffused. Under an embodiment, a light emitter module such as the first light emitter module 302 may be set for an irradiance or energy level defined or measured in units of $\mu W/cm^2$. At step 406, a second light is emitted. In some embodiments, the second light may be emitted by the second light emitter module 312, and the second light may be collimated and/or diffused. Under some embodiments, at step 404 the light emitter module 302 may be switched or turned on, causing the first light to be emitted, and then at step 404 the light emitter module 312 may be switched on, causing the second light to be emitted concurrently with the first light. Under other embodiments, at step 404 the light emitter module 302 may be switched on and then switched off, causing the first light to be emitted for a period of time, and then at step 404 the light emitter module 312 may be switched on and then switched off, causing the second light to be emitted consecutively to the first light. At step 408, if the first light and the second light are emitted concurrently, such light may be combined by a light combiner module 320 and the combined light may be directed onto the same light path concurrently. Alternatively, at step 408 if the first light and the second light are emitted consecutively, then instead of combining the first light and the second light, each light may be directed onto the same light path consecutively by the light combiner module 320.

At step 410, an optional third light may be emitted by a third light emitter module. It is to be understood that any combination of a plurality of light emitter modules may be utilized, where each emits a different wavelength of light. For example, under some embodiments, white light may be formed by concurrently emitting red light (corresponding to the first light), blue light (corresponding to the second light), and green light (corresponding to the third light). It is to be understood that any desirable combination of light may be emitted consecutively or concurrently by respective light emitter modules in order to facilitate calibration of an ALS. At step 412, if additional wavelengths of light are emitted, such as a third light, then the third light may be combined with the first light and the second light, when such light is emitted concurrently. It is to be understood that, although two or three beams of light may be combined in the example of FIG. 4, more than three wavelengths of light may be emitted consecutively or emitted concurrently and combined under other embodiments.

At step 414, an optional fourth light may be emitted by a fourth light emitter module, similar to the embodiment depicted in FIG. 2 in which the fourth light may be infrared light. It is to be understood that any desirable combination of light may be emitted consecutively or concurrently by respective light emitter modules in order to facilitate calibration of an ALS. At step 416, if additional wavelengths of light are emitted, such as a fourth light, then the fourth light may be combined with the first light, the second light, and the third light, when such light is emitted concurrently. It is to be understood that some light emitters may emit light concurrently with respect to each other, and consecutively with respect to others. For example, the first light and the second light may be emitted concurrently, and then the third light and the fourth light may be emitted concurrently, such that the third and fourth light are emitted consecutively with respect to the first and second light.

At step 418, a test light may be directed, projected, or flashed to the ALS 352 of the electronic device 354. The test light may include the first light from step 404 and/or the second light from step 406. If an optional third light was emitted from step 410, then the test light may include the first light, the second light, and/or the third light. Similarly, if an optional fourth light was emitted from step 414, then the test light may include the first light, the second light, the third light, and/or the fourth light. Under other embodiments, when more than four lights are emitted concurrently by more than four light emitters, then the test light may include a combination of such emitted light.

At step 420, the ALS 354 of the electronic device 352 may be calibrated, for example, by determining a gain for each light detector, photodiode, or the like of the ALS 354 and storing each gain in memory of the ALS 354. Under some embodiments, the ALS 354 may receive the test light from step 418 and may output a measurement of the test light, such as a lux value or a count of lux. A non-limiting embodiment may include three consecutive test lights. For example, under the embodiment depicted in FIG. 1, a first test light may comprise green light, and the ALS 354 may output a lux value of the green light to the processor of the electronic device 352. Then, a second test light may comprise infrared light, and the ALS 354 may output a lux value of the infrared light. Then, a third test light may comprise combined green and infrared light, and the ALS 354 may output a lux value of the third test light. Under this embodiment, the processor of the electronic device 352 may calculate at least one gain value based on such example measurements. For example, if the ALS 354 has two photodiodes, in which one corresponds to visible light and the other corresponds to infrared light, two gain values may be calculated with respect to the two photodiodes based on the measurements of the first test light and the second test light to eliminate the effect of infrared light on ambient light measurements. The measurement of the third test light may be used for gain calculation verification purposes.

Calculated gain values may be transmitted from the processor of the electronic device 352 to the ALS 354 where the gain values may be stored in registers of the ALS 354. The ALS 354 may then be set to normal mode and the electronic device may exit diagnostic mode, and thereafter, the ALS 354 may sense and measure ambient light and transmit such measurements and the gain values to the processor of the electronic device 352. The processor may then adjust ambient light measurements based on the gain values, resulting in adjusted or calibrated measurements of the ambient light. The processor may then use the adjusted ambient light measurements to dim or brighten a display component, for example.

Figure 5:
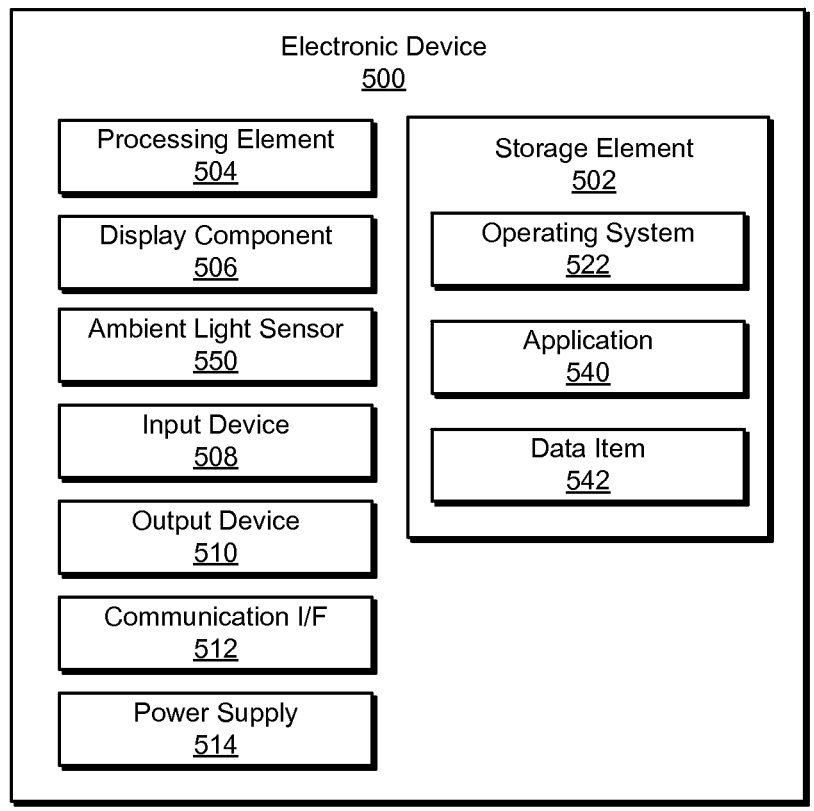
FIG. 5 illustrates an example block diagram of an electronic device, in accordance with embodiments of the present invention.

FIG. 5 illustrates an example block diagram of an electronic device 500, in accordance with embodiments of the present invention. The electronic device 500 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein.

The electronic device 500 may include a display component 506. The display component 506 may comprise, for example, one or more devices such as cathode ray tubes (CRTs), liquid crystal display (LCD) screens, gas plasma-based flat panel displays, LCD projectors, or other types of display devices, etc. The electronic device 500 may include one or more input devices 508 operable to receive inputs from a user. The input devices 508 can include, for example, a push button, touch pad, touch screen, wheel, joystick, keyboard, mouse, trackball, keypad, accelerometer, light gun, game controller, or any other such device or element whereby a user can provide inputs to the electronic device 500. These input devices 508 may be incorporated into the electronic device 500 or operably coupled to the electronic device 500 via wired or wireless interface. For computing devices with touch sensitive displays, the input devices 508 can include a touch sensor that operates in conjunction with the display component 506 to permit users to interact with the image displayed by the display component 506 using touch inputs (e.g., with a finger or stylus). The computing device 500 may also include an output device 510, such as one or more audio speakers and a USB port.

The electronic device 500 may also include an ALS 550 which may measure or read ambient light. The ALS 550 may have a dimension of 2 mm by 2 mm by 0.6 mm, and may be behind a circular portion of a cover glass having a diameter of 1 mm creating a field of view through the cover glass for the ALS 550. The ALS 550 may comprise one or more light detectors or photodiodes, such as one photodiode which may measure visible light, and another photodiode which may measure infrared light. A photodiode may be coupled to an analog-to-digital converter (ADC), and each ADC may be coupled to a digital signal processor of the ALS. The processing element 504 or processor may utilize the measurements to cause adjustment of the brightness of the display component 506. In an embodiment, the ambient light sensor 550 may comprise memory, such as registers, to store one or more calibration values, such as a gain, for optimization of ambient light measurements of the ambient light sensor 550. In an embodiment, the storage element 502, which may include firmware, may also store one or more calibration values, which may be beneficial if a register of the ALS 550 were accidentally erased, since a calibration value can be restored to a register from the storage element 502. The ALS 550 may comprise, for example, part number MAX44009 from Maxim Integrated Products, Inc., of San Jose, Calif.

The electronic device 500 may also include at least one communication interface 512, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the electronic device 500 may also include one or more wired communications interfaces for coupling and communicating with other devices. The electronic device 500 may also include a power supply 514, such as, for example, a rechargeable battery operable to be recharged through conventional plug-in approaches, or through other approaches such as capacitive charging.

The electronic device 500 may also include a processing element 504 for executing instructions and retrieving data stored in a storage element 502. As would be apparent to one of ordinary skill in the art, the storage element 502 can include one or more different types of memory, data storage or computer-readable storage media, such as, for example, a first data storage for program instructions for execution by the processing element 504, and a second data storage for images or data and/or a removable storage for transferring data to other devices. The storage element 502 may store software for execution by the processing element 504, such as, for example, operating system software 522 and applications 540. The storage element 502 may also store a data item 542, such as, for example, data files corresponding to one or more applications 540.

Embodiments of the present invention may provide various advantages not provided by prior art systems. An exemplary advantage of some disclosed embodiments may be that, because the gain error may be reduced from about plus or minus 15% to about plus or minus 3%, the manufacturing cycle time to calibrate an ALS may be reduced because there is reduced need for a plurality of measurements of the same wavelength of light emitted at approximately the same energy level, and thus there is reduced need to apply an average or a root mean square to the plurality of such measurements. Furthermore, there is a reduced need to cool or ventilate the light emitters or to implement a mechanical color filter wheel.

While the invention has been described in terms of particular embodiments and illustrative figures, those of ordinary skill in the art will recognize that the invention is not limited to the embodiments or figures described. Many of the embodiments described above in relation to calibration of an ambient light sensor may be applied to the calibration of other sensors of radiant energy having an electromagnetic spectrum such as gamma rays, x rays, ultraviolet light, visible light, infrared light, microwave, and radio waves.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the processes, flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system for calibrating a sensor of an electronic device, the system comprising:
    an illumination assembly comprising:
        a first light emitter configured to emit first light having a first wavelength;
        a second light emitter configured to emit second light having a second wavelength;
        a first light combiner comprising a first exit port;
        a first light diffuser positioned between the first light emitter and the first light combiner, the first light diffuser being configured to receive the first light and output first diffuse light; and
        a second light diffuser positioned between the second light emitter and the first light combiner, the second light diffuser being configured to receive the second light and output second diffuse light; and
        wherein the first light combiner is configured to:

receive the first diffuse light and to output the first diffuse light via the first exit port of the first light combiner; and receive the second diffuse light and to output the second diffuse light via the first exit port of the first light combiner; and an opaque housing comprising an interior region enclosing the illumination assembly, wherein the opaque housing is effective to reduce an amount of light from an exterior of the opaque housing from entering the interior region of the opaque housing.

2. The system of claim 1, further comprising:

a first light collimator positioned between the first light emitter and the first light diffuser, the first light collimator configured to collimate the first light; and a second light collimator positioned between the second light emitter and the second light diffuser, the second light collimator configured to collimate the second light.

3. The system of claim 1, further comprising:

a fixture coupled to the opaque housing and configured to retain the electronic device such that the sensor is positioned to receive the first light and the second light from the first light combiner through a second exit port of the opaque housing.

4. The system of claim 1, further comprising:

a computing system operably coupled with the illumination assembly, the computing system configured to cause the first light emitter to emit the first light and cause the second light emitter to emit the second light.

5. The system of claim 4, wherein the computing system is operably coupled to the electronic device to cause the sensor to measure a first intensity value for the first light and a second intensity value for the second light.

6. The system of claim 1, wherein the first light combiner comprises:

a first entry port positioned to receive the first diffuse light from the first light diffuser; and a second entry port positioned to receive the second diffuse light from the second light diffuser, and wherein the first light combiner combines the first diffuse light and the second diffuse light to produce combined diffuse light.

7. The system of claim 1, wherein the illumination assembly further comprises:

a light reflector disposed within the interior region of the opaque housing comprising an entry port of the light reflector and an exit port of the light reflector, wherein the light reflector is positioned to receive a combined light from the first light combiner via the entry port of the light reflector and configured to output the diffuse light via the exit port of the light reflector; and a third light diffuser disposed within the interior region of the opaque housing and positioned to receive the first diffuse light and the second diffuse light from the light reflector and configured to further diffuse the first diffuse light and the second diffuse light.

8. The system of claim 1, further comprising:

a second light combiner disposed within the interior region of the opaque housing, the second light combiner comprising a second exit port;

a third light emitter disposed within the interior region of the opaque housing and configured to emit third light having a third wavelength different from the first and second wavelengths;

a third light diffuser positioned between the third light emitter and the second light combiner, the third light diffuser being configured to receive the third light and output third diffuse light; and wherein the second light combiner is configured to:

receive the first diffuse light from the first light combiner and to output the first diffuse light via the second exit port;

receive the second diffuse light from the first light combiner and to output the second diffuse light via the second exit port; and receive the third diffuse light from the third light diffuser and to output the third diffuse light via the second exit port.

9. The system of claim 8, further comprising:

a fourth light emitter disposed within the interior region of the opaque housing and configured to emit fourth light corresponding to a fourth wavelength; and a third light combiner disposed within the interior region of the opaque housing, the third light combiner comprising a third exit port and configured to:

receive the first diffuse light from the second light combiner and to output the first diffuse light via the third exit port;

receive the second diffuse light from the second light combiner and to output the second diffuse light via the third exit port;

receive the third diffuse light from the second light combiner and to output the third diffuse light via the third exit port; and receive the fourth light and to output the fourth light via the third exit port.

10. The system of claim 9, further comprising:

a first light collimator positioned between the first light emitter and the first light diffuser to receive the first light and configured to collimate the first light, wherein the first light diffuser is positioned between the first light collimator and the first light combiner;

a second light collimator positioned between the second light emitter and the second light diffuser to receive the second light and configured to collimate the second light, wherein the second light diffuser is positioned between the second light collimator and the first light combiner;

a third light collimator positioned between the third light emitter and the third light diffuser to receive the third light and configured to collimate the third light;

a fourth light collimator positioned between the fourth light emitter and the third light combiner to receive the fourth light and configured to collimate the fourth light; and a fourth light diffuser positioned between the fourth light collimator and the third light combiner to receive the fourth light and configured to output fourth diffuse light.

11. The system of claim 10, further comprising:

a light reflector disposed within the interior region of the opaque housing comprising an entry port of the light reflector and an exit port of the light reflector, wherein the light reflector is positioned to receive the first diffuse light, the second diffuse light, the third diffuse light, and the fourth light from the third light combiner via the entry port of the light reflector and configured to output the first diffuse light, the second diffuse light, the third diffuse light, and the fourth diffuse light via the exit port of the light reflector; and a fifth light diffuser disposed within the interior region of the opaque housing and positioned to receive the first diffuse light, the second diffuse light, the third diffuse light, and the fourth diffuse light from the light reflector and configured to further diffuse the first diffuse light, the second diffuse light, the third diffuse light, and the fourth diffuse light.

12. The system of claim 1, wherein:
the first light combiner is further configured to output the first diffuse light and the second diffuse light along a light path towards the sensor.

13. The system of claim 1, further comprising:
a fixture coupled to a first external surface of the opaque housing; and
a second exit port formed in the first external surface of the opaque housing and positioned to align with the sensor of the electronic device when the electronic device is retained on an exterior surface of the fixture, wherein at least the first diffuse light and the second diffuse light are directed through the second exit port to the sensor of the electronic device.

14. A method comprising:
emitting, by a first light emitting device, first light having a first wavelength and a first irradiance;
diffusing, by a first diffuser positioned between the first light emitting device and a first light combiner, the first light to output first diffuse light;
receiving, by the first light combiner, the first diffuse light;
directing, by the first light combiner, the first diffuse light along a first light path towards an ambient light sensor;
emitting, by a second light emitting device, second light having a second wavelength and a second irradiance;
diffusing, by a second diffuser positioned between the second light emitting device and the first light combiner, the second light to output second diffuse light;
receiving, by the first light combiner, the second diffuse light;
directing, by the first light combiner, the second diffuse light along the first light path towards the ambient light sensor;
receiving, by the ambient light sensor, at least the first diffuse light and the second diffuse light through an exit port of an opaque housing; and
calibrating the ambient light sensor with at least the first diffuse light and the second diffuse light.

15. The method of claim 14, further comprising:
collimating the first light prior to being received by the first diffuser; and
collimating the second light prior to being received by the second diffuser.

16. The method of claim 14, further comprising:
emitting, by a third light emitting device, third light having a third wavelength and a third irradiance;
receiving, by a second light combiner, the first diffuse light, the diffuse second light, and the third light;
directing, by the second light combiner, the first diffuse light, the second diffuse light, and the third light along a second light path towards the ambient light sensor, wherein the first light path comprises the second light path; and
calibrating the ambient light sensor with the third light.

17. The method of claim 14, further comprising:
reducing an amount of light from an exterior of the opaque housing from entering an interior region of the opaque housing, wherein the first light emitting device, the first light combiner, and the second light emitting device are disposed in the interior region of the opaque housing.

18. A system for calibrating a sensor of an electronic device, the system comprising:
an illumination assembly comprising:
a first light emitter configured to emit first light having a first wavelength;
a first light collimator positioned between the first light emitter and a first light diffuser, the first light collimator configured to collimate the first light;
the first light diffuser positioned between the first light collimator and a first light combiner, the first light diffuser configured to output first diffuse light; and
a second light emitter configured to emit second light having a second wavelength;
wherein the first light combiner comprises a first exit port and is configured to:
receive the first diffuse light and to output the first diffuse light via the first exit port of the first light combiner; and
receive the second light and to output the second light via the first exit port of the first light combiner; and
an opaque housing comprising an interior region enclosing the illumination assembly, wherein the opaque housing is effective to reduce an amount of light from an exterior of the opaque housing from entering the interior region of the opaque housing.

19. The system of claim 18, further comprising:
a second light collimator positioned between the second light emitter and the first light combiner, the second light collimator configured to collimate the second light.

20. The system of claim 19, further comprising:
a second light diffuser positioned between the second light collimator and the first light combiner configured to output second diffuse light.

* * * * *